(12) United States Patent
Sojan et al.

(10) Patent No.: US 8,087,033 B2
(45) Date of Patent: Dec. 27, 2011

(54) TASK-BASED TOOL FOR SPEEDING AND CUSTOMIZING INTERACTIONS WITH WEB DOCUMENTS

(75) Inventors: Ajoy Sojan, Sunnyvale, CA (US); Raj Gopal Prasad Kantamneni, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1130 days.

(21) Appl. No.: 11/849,214

(22) Filed: Aug. 31, 2007

(65) Prior Publication Data
US 2009/0064010 A1    Mar. 5, 2009

(51) Int. Cl.
G06F 3/00 (2006.01)
G06F 3/048 (2006.01)
(52) U.S. Cl. .................. 719/318; 715/827; 715/848
(58) Field of Classification Search .............. 719/318; 715/867, 827, 848
See application file for complete search history.

(56) References Cited

U.S. PATENT DOCUMENTS

| | | | |
|---|---|---|---|
| 6,363,433 B1 * | 3/2002 | Nakajima | 719/313 |
| 6,724,399 B1 * | 4/2004 | Katchour et al. | 715/740 |
| 6,879,988 B2 * | 4/2005 | Basin et al. | 1/1 |
| 7,275,086 B1 * | 9/2007 | Bodnar | 709/218 |
| 7,552,400 B1 * | 6/2009 | Sriver et al. | 715/827 |
| 7,562,113 B2 * | 7/2009 | Labarge et al. | 709/203 |
| 2005/0125745 A1 * | 6/2005 | Engestrom et al. | 715/847 |

OTHER PUBLICATIONS

Ian S. Thomas, OLAF: The GOAD Active Database Event/Rule Tracer, 1996.*

* cited by examiner

Primary Examiner — Lechi Truong
(74) Attorney, Agent, or Firm — James J. DeCarlo; Greenberg Traurig, LLP

(57) ABSTRACT

A tool which allows users to define one or more event/action pairs, thereby speeding and customizing the user's interaction with web documents. Such event/action pairs may include keyboard shortcuts and associated actions, and the user can add, edit, or delete some or all such keyboard shortcuts through a convenient interface. The event/action pairs may also be associated with an account provided by a service provider, whereby the user can cause any browser that can access the service provider to load the event/action pairs, which in turn allows the user to work efficiently regardless of the computing device and/or browser available to the user.

23 Claims, 14 Drawing Sheets

```
/* ==================== */
/* @ MAIN FUNCTION      */
/* ==================== */
function trapEvents(event)
begin
        if (not initialized)
                initialize()

if (event not mapped in user configuration)
                ignore
                exit function task = checkUserTask() /* figure out what user is doing */
        actions = getMappingForEvent(event, task);

ExecuteActions(actions)
end
/* ==================== */
function initialize()
begin
        config = readUserConfiguration()
        url = getBrowserUrl()
        if (config not available)
                config = obtainDefaultConfigFromServer(url)
                /* default configuration based on what user is doing */ mappings = parseConfigToObtainMappings(config)
        storeMappings(mappings);
end
/* ==================== */
function checkUserTask()
begin
        url = getBrowserUrl()
        workspace = getUserWorkspace()
        userInfo = getUserInfoStoredInCookie()
        userTask = getUserSpecifiedTaskInBrowser()

task = getUserTask(url, workspace, userInfo, userTask)
        /* any of these variables can be used to determine the task */
        return task
end
/* ==================== */
function getMappingForEvent(event, task)
begin
        mappings = readMappings()
        actions = findActionForEvent(event, task, mappings)
        return actions
end
```

Figure 8

```
<Script name=user-defined-Script-1>
<open-tab id=1> http://entertainment.tv.yahoo.com
<open-tab id=2> http://finance.yahoo.com
</script>
```

Figure 13

```
<event name="Ctrl-1">
    <key ctrl="on" shift="off" alt="off">1</key>
</event>
<action name="user-defined-1">
    <Script name=user-defined-Script-1>
</action>

<mapping event="Ctrl-1" >
    <task name="Home" action="user-defined-1" />
</mapping>
```

Figure 14

TASK-BASED TOOL FOR SPEEDING AND CUSTOMIZING INTERACTIONS WITH WEB DOCUMENTS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of user/computer interactions and interfaces, and more specifically provides a task-based tool which facilitates rapid and customizable interactions with web documents.

BACKGROUND

Many applications provide individualized keyboard shortcuts. By way of example, in most recent versions of Microsoft Word, distributed by the Microsoft Corporation of Redmond, Wash., holding the CTRL key and pressing the B key will toggle the use of bold fonts. In some cases, de facto "standards" have been adopted for certain keyboard shortcuts, such that those shortcuts work across applications. For example, in most computer software applications for the Microsoft Windows family of operating systems, holding the CTRL key and pressing the C key will copy any selected data into a "clipboard" for later use, and holding the CTRL key and pressing V will paste the contents of the clipboard into a document, text box, field, or the like. Still other applications allow users to customize the keyboard shortcuts for that particular application. For example, in most recent versions of Microsoft Word, a user can specify that, while simultaneously holding the CTRL and ALT keys and pressing the V key will toggle the application of specific font, paragraph, and other formatting to subsequently typed and/or selected text.

SUMMARY

Unlike most other computer software, web browsers, such as the Internet Explorer browser distributed by the Microsoft Corporation of Redmond, Wash.; the Mozilla Firefox browser distributed by the Mozilla Foundation of Mountain View, Calif.; or the Safari web browser distributed by Apple Computer, Inc. of Cupertino, Calif., do not typically support more than a few fundamental keyboard shortcuts. Typically, web browsers include keyboard shortcuts for opening new browser windows, printing the current window, stopping the loading of the current window, refreshing the page displayed in the current window, copying selected information to a clipboard and pasting information from the clipboard, moving forward and backward through a list of recently browsed web sites, toggling between a full-screen display and the display of traditional window controls as part of the browser (e.g., a title bar, status bar, and the like), iterating through fields and actionable areas in the displayed window, and moving the focus to the address bar portion of the browser window. While such features are useful, most conventional web browsers do not allow users to add additional keyboard shortcuts, nor do conventional web browsers allow users to override current keyboard shortcuts. Accordingly, the instant disclosure is directed to a task-based tool for speeding and customizing interactions with web documents that substantially obviates one or more of the problems due to limitations and disadvantages of the related art.

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

The instant disclosure is directed to a task-based tool for speeding and customizing interactions with web documents. In some embodiments, the tool can be implemented as one or more JavaScript libraries, or using another platform-independent programming language. Exemplary pseudocode for implementing such libraries is included below in FIG. 8. In such embodiments, the tool may be loaded by the browser when the browser displays one or more pages containing references to the library. The JavaScript library can include instructions which intercept keystrokes pressed by the user while the user is using a web browser, and which perform such interception before such keystrokes are processed by the web browser. The instructions review the keystrokes and forward most keystrokes to the web browser for processing. However, those keystrokes identified as corresponding to a keyboard shortcut are intercepted and processed by the JavaScript library in accordance with the functions associated with the keyboard shortcut. In some embodiments, the tool can be implemented as part of a browser helper application such as, without limitation, a browser "toolbar". In such embodiments, the tool may be written in a platform-dependent programming language, such as C++, C#, Visual Basic, or the like.

In some embodiments, the tool comes with certain, predefined keyboard shortcuts. Such keyboard shortcuts are also referred to herein as event-action pairs. When a keyboard event (or keyboard shortcut) is trapped by the tool, the tool can cause the action corresponding to that keyboard event to be taken by the browser, the operating system in which the browser is running, or by one or more other applications installed on or accessible to the computing device on which the tool is running. By way of example, without limitation, the tool may permit a user to define an event-action pair for navigating to a specific web site; initiating an Internet search using a default search engine; initiating the search of the web site being displayed by the browser; initiating a search of the contents of the page being displayed by the browser; invoking a specific application, such as an instant messaging client; invoking a feature of a specific application, such as opening an instant messaging session with a particular user; adding a page to an Internet-based set of bookmarks; adding a page to a specific bookmark category; initiating the E-mailing of a copy of the web page currently displayed by the browser; initiating the E-mailing of the page currently displayed by the browser to one or more default users; E-mailing a copy of the page currently displayed in the browser to the user's default E-mail address; adding the page, image, video, or the like currently displayed in the browser to one or more collections of research artifacts; and the like.

In some embodiments, the event-action pairs may be associated with a user identifier, such as, without limitation, a login to an Internet web site or the like. In such embodiments, the tool may provide an interface through which the user can provide a username and password or other credentials, thereby logging into such a web site. Once the user has appropriately logged in, the tool can obtain the event-action pairs for that user from the web site or a related web site. This can allow the user's preferred event-action pairs to follow the user across a plurality of computing devices, unlike traditional keyboard shortcut modifications which are specific to that computing device.

Some embodiments comprise a method comprising obtaining a first set of computer program instructions, wherein the first set of computer program instructions facilitates the trapping of events received by a web browser; obtaining a set of event/action pairs; causing the first set of computer program instructions to run such that the events received by the web browser are trapped; monitoring the trapped events to determine whether a trapped event corresponds to one of the event/action pairs; forwarding the event to the browser for processing if the event does not correspond to an event/action pair; determining an action to be triggered based on the event if the event corresponds to an event/action pair; and, triggering the action. In some embodiments, the event/action pairs can be obtained from a server. In some embodiments, a default set of event/action pairs can be obtained from the server.

Some embodiments may further comprise determining a task being performed by the user and, monitoring the trapped events such that only those event/action pairs from the set of event/action pairs which correspond to the task are performed. In some such embodiments the task can be determined by receiving a task identifier from a user. The task may also be determined based on the context of the browsing session, from context information supplied by the operating system, context information provided by the user, or the like. By way of example, without limitation, some desktop operating systems allow users to have open separate "virtual desktops" with each virtual desktop running a different set of applications, and having a different configuration, than the others. The instant system can utilize information about such virtual desktops to determine an appropriate context, and thus the event/action pairs, that should be loaded. In some embodiments, the event/action pairs are obtained from a server, and a default set of event/action pairs can be obtained from the server if the user-specific event/action pairs are unavailable. In some embodiments, the user-specific event/action pairs may be obtained by first obtaining a set of credentials from the user, and the set of event/action pairs can be obtained from the server based on the credentials.

In some embodiments, the instant tool can be loaded by a browser from a first set of computer program instructions which are obtained when the browser loads a web page. In some embodiments, the instant tool can be loaded as part of a browser helper object is loaded by the browser.

Some embodiments may further comprise receiving from the user a request to modify an event/action pair; presenting a user interface to the user by which the user can modify an event/action pair; and, storing the modified event/action pair. The modified event/action pair can be associated with the user and stored on a server. The event/action pair modification may comprise the addition of a new event/action pair, deletion of an event/action pair, or the modification of an action associated with the event. In some embodiments, the user may be presented with a set of predefined actions from which the user can select a desired action to be associated with an event.

It is to be understood that both the foregoing general description and the following detailed description are exemplary and explanatory and are intended to provide further explanation of the disclosed task-based tool for speeding and customizing interactions with web documents.

BRIEF DESCRIPTION OF THE DRAWINGS

The accompanying drawings, which are included to provide a further understanding of the disclosed task-based tool for speeding and customizing interactions with web documents and are incorporated in and constitute a part of this specification, illustrate various embodiments and, together with the description, serve to explain the principles of at least one embodiment of the disclosed task-based tool for speeding and customizing interactions with web documents.

In the drawings:

FIG. 8 provides exemplary pseudocode for implementing logic associated with the task-based tool described herein.

FIG. 13 is exemplary XML code recording the actions taken by the user in FIG. 11.

FIG. 14 is exemplary XML code defining the event/action pair recorded in FIGS. 10-12.

DETAILED DESCRIPTION

Reference will now be made in detail to embodiments of the disclosed task-based tool for speeding and customizing interactions with web documents, examples of which are illustrated in the accompanying drawings.

Figure 1:
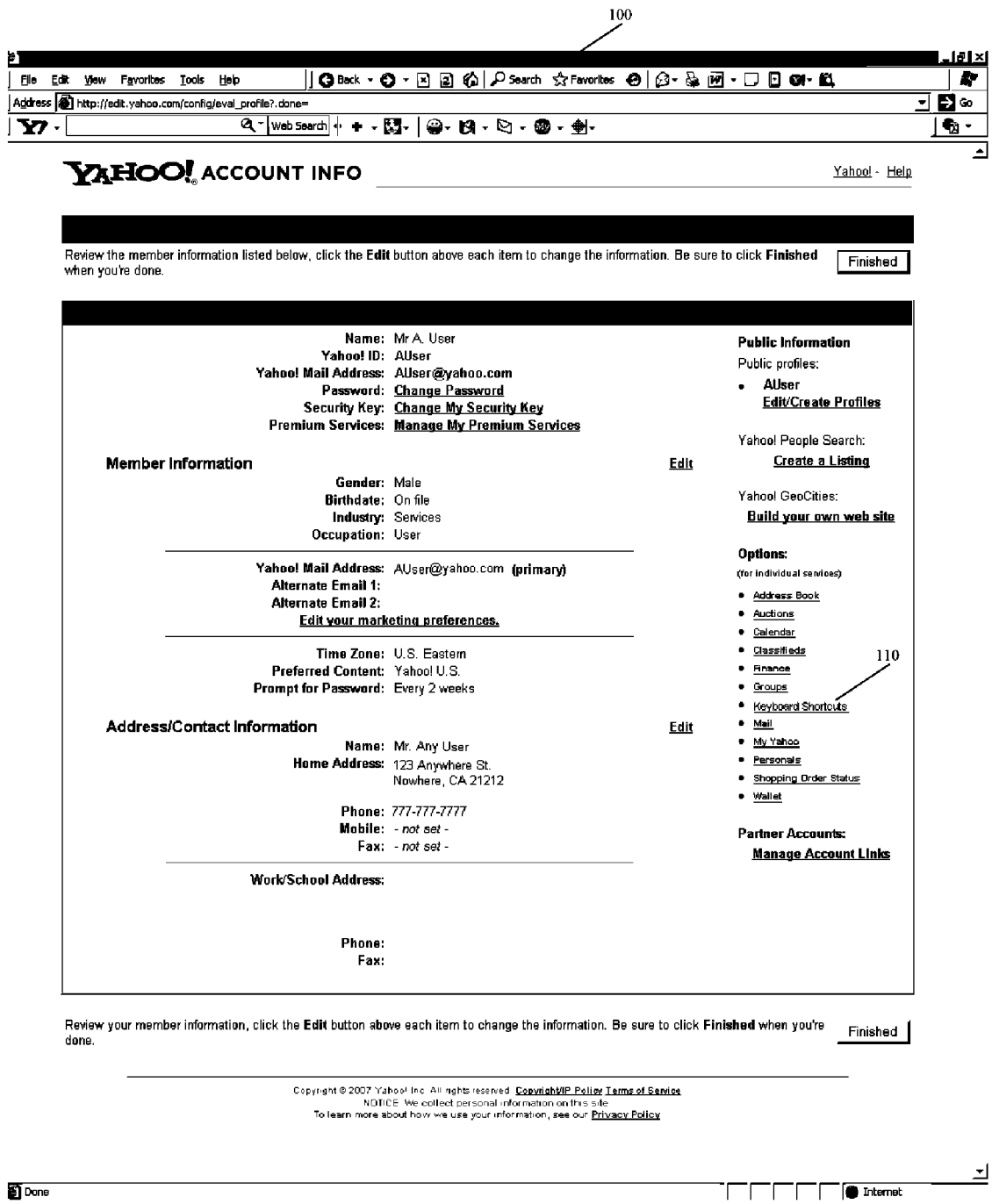
FIG. 1 is a screen capture illustrating an exemplary interface through which a user can begin altering user account preferences.

FIG. 1 is a screen capture illustrating an exemplary interface 100 through which a user can begin altering user account preferences. In FIG. 1, the user has logged into a service provided by a service provider, such as the Yahoo! Messenger service provided by the assignee of the instant application. In such an embodiment, the browser can take advantage of cookies or other temporary or permanent information available thereto to persistently identify the user throughout a browser session. In some embodiments, the identification may persist across a plurality of browser sessions. Once logged in, the user can enter or change account-related preferences and other information via a browser-based interface 100. In some embodiments, browser-based interface 100 may be generated locally by one or more applications running on the user's computing device or by scripts available to the browser. In other embodiments, browser-based interface 100 may be generated by one or more servers. In some embodiments, one or more dialog boxes or the like may be presented to the user in lieu of or in addition to browser-based interface 100.

Referring again to FIG. 1, the user can use browser based interface 100 to add, remove, or otherwise alter account-related preferences. By clicking on or otherwise interacting with keyboard shortcut link 110, the user can indicate his or her desire to alter the event/action pairs associated with the user's account.

Figure 2:
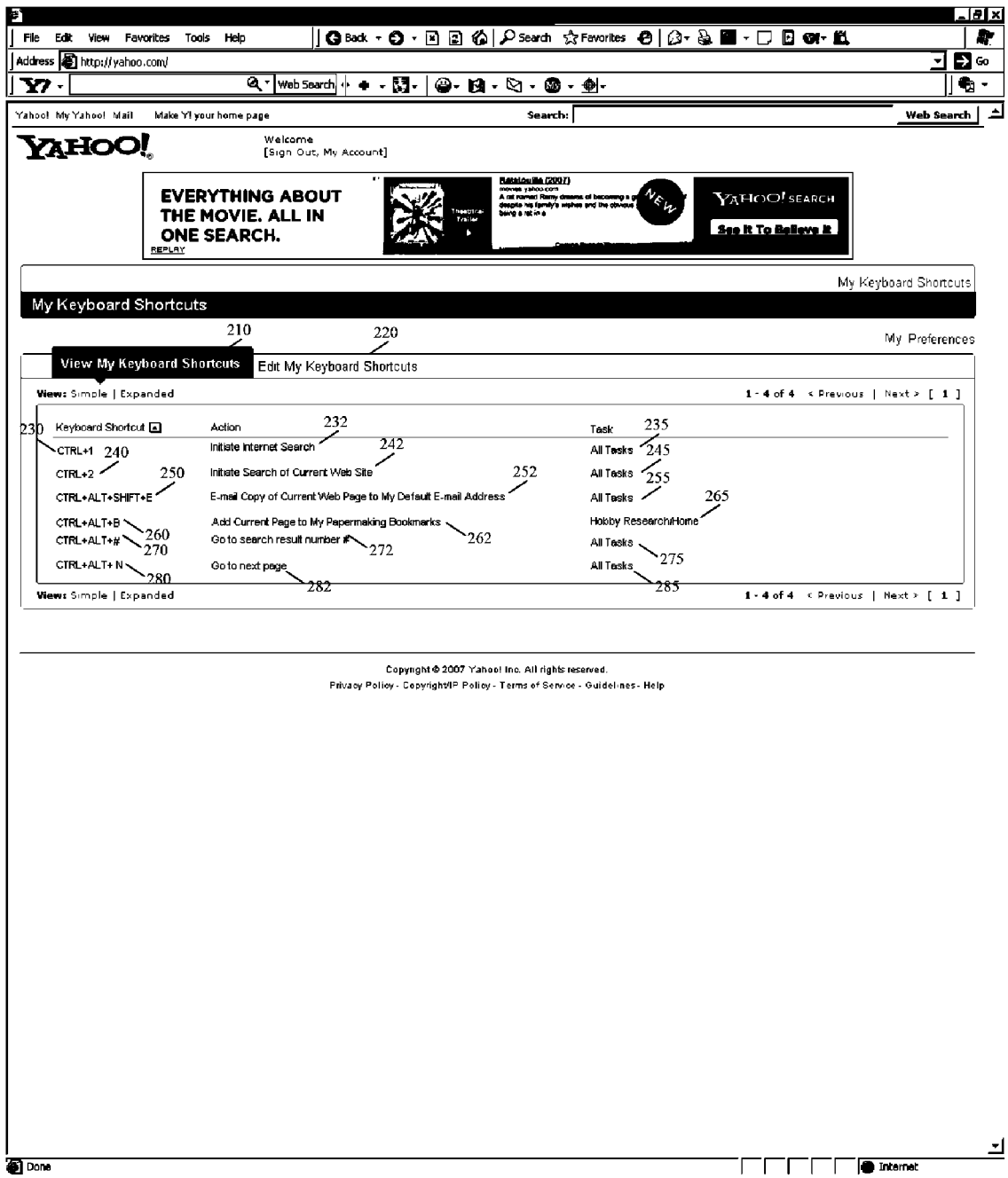
FIG. 2 is a screen capture illustrating an exemplary interface through which a user can review the event/action pairs associated with the user account.

When the user interacts with keyboard shortcut link 110, a screen similar to that illustrated in FIG. 2 can be displayed. FIG. 2 is a screen capture illustrating an exemplary interface through which a user can review the event/action pairs associated with the user account. The user interface illustrated in FIG. 2 allows a user to easily review the available keyboard shortcuts 230, 240, 250, 260, 270, and 280 and the actions 232, 242, 252, 262, 272, and 282, respectively, associated therewith. The user interface of FIG. 2 may also list task(s) 235, 245, 255, 265, 275, and 285, respectively, with which the displayed event/action pair is associated. Tasks are discussed in more detail below. In some embodiments, the user interface of FIG. 2 may be limited to displaying only those keyboard shortcuts associated with the current task. In some embodiments, a user may choose to keep the user interface open for reference in a separate browser window or separate tab within a browser.

Figure 3:
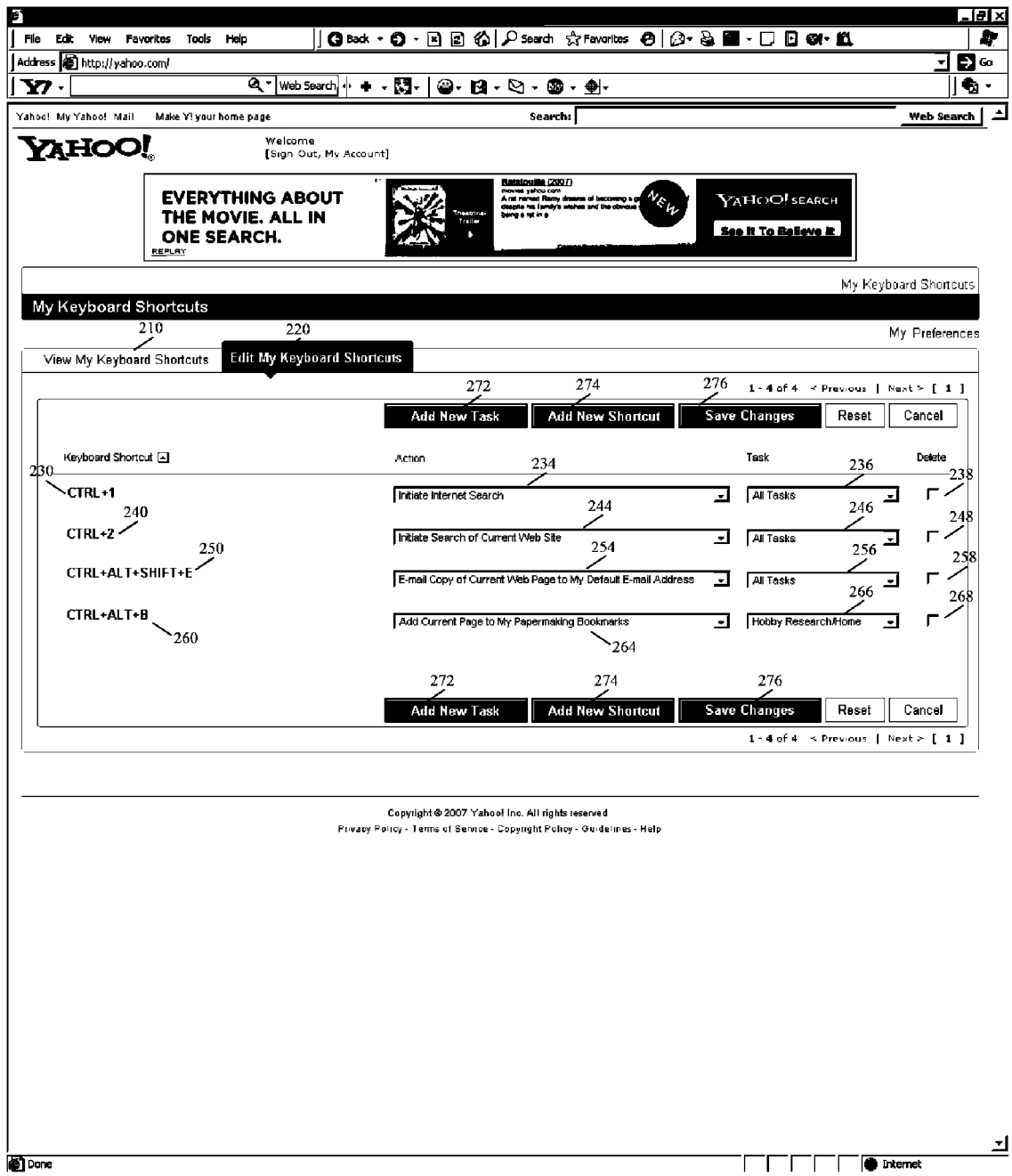
FIG. 3 is a screen capture illustrating an exemplary interface through which a user can edit the event/action pairs associated with the user account.

The flexibility afforded by the disclosed tool allows users to create and edit event/action pairs, and to easily delete them when they are no longer needed. FIG. 3 is a screen capture illustrating an exemplary interface through which a user can edit and delete the event/action pairs associated with a user account. In some embodiments, the user can easily switch between reviewing the keyboard shortcut list illustrated in FIG. 2 and editing the currently defined keyboard shortcuts as illustrated in FIG. 3 by clicking a desired tab 210 or 220. In some embodiments, such as that illustrated in FIG. 3, some event/action pairs may be hard coded into the tool, such that the user cannot edit those event/action pairs. In such embodiments, the user may not see, or see but may not be able to edit, the event/action pairs. By way of example, without limitation, the CTRL+ALT+# and CTRL+ALT+N keyboard shortcut definitions listed in FIG. 2 are not present in FIG. 3 because those keyboard shortcuts are hard coded into the tool.

The user interface illustrated in FIG. 3 allows the user to select from a set of pre-defined actions for a given event. By way of example, the user may select an action from a set of actions in the drop-down box 234, 244, 254, 264 that corresponds to the appropriate keyboard shortcut 230, 240, 250, 260. This allows the user to easily assign a new action to an existing keyboard shortcut. The user can also limit a keyboard shortcut to working with a specific task by selecting the task from a drop-down list or other set of tasks, such as drop-down lists 236, 246, 256, and 266 of FIG. 3.

Tasks allow a user to assign different functions to the same keyboard shortcut depending on the task the user is performing. By way of example, without limitation, many users will E-mail copies of web pages to groups of friends for their reference. In an embodiment, the user can designate that the same keyboard shortcut will send the web page to a different default set of recipients based on the task. Similarly, users may prefer that, by default, when a web site is bookmarked, that the bookmark be automatically added to a bookmark category based on the task.

In some embodiments, the instant tool can determine the task based on the context of the browsing session. By way of example, without limitation, the user can associate a set of web sites, keywords, and the like with each task. In such an example, whenever a web site is visited that corresponds to a web site associated with a task, whenever a web site is visited with a keyword that is associated with a task (or wherein the keyword is used more than some user-determinable number of times, or wherein more that two different keywords are used on the same page), or the like, the instant tool can assume that the task is to be selected. The instant tool can then automatically load the event/action pairs associated with the task. In some embodiments, the user can define a default task, and the event/action pairs associated with the default task can be used by the instant tool except when an alternative task is detected, or when another task is selected by the user.

The user interface illustrated in FIG. 3 also allows the user to add new tasks by clicking on or otherwise interacting with Add New Task buttons 272. Similarly, a user can add a new event/action pair by clicking on or otherwise interacting with the Add New Shortcut buttons 274. An event/action pair definition can be deleted from the user's account by checking one of delete check boxes 238, 248, 258, or 268, as appropriate, and then clicking one of Save Changes buttons 276.

Figure 4:
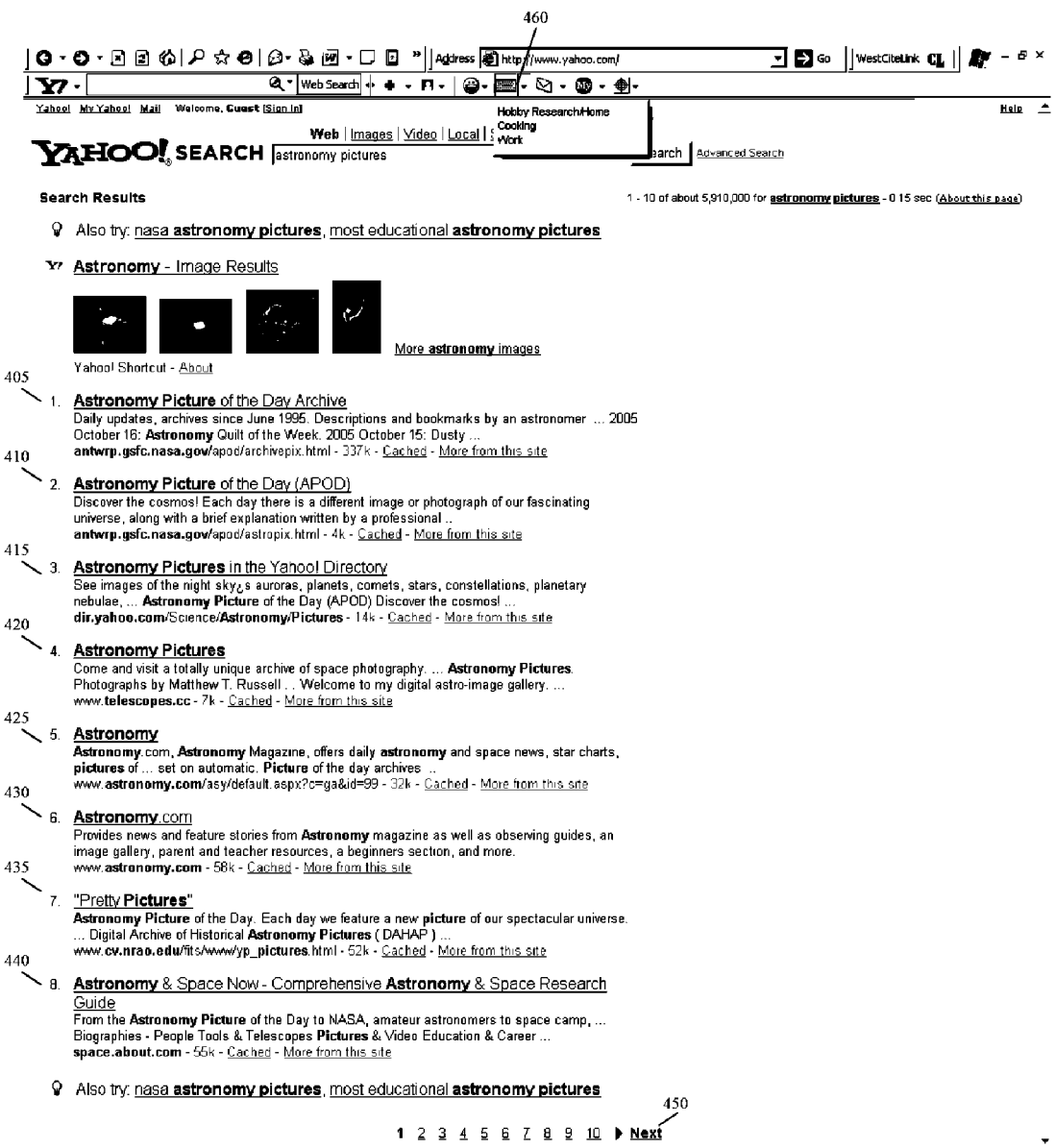
FIG. 4 is a screen capture illustrating an exemplary search result user interface.

FIG. 4 is a screen capture illustrating an exemplary search result user interface employing the instant tool. In the embodiment illustrated in FIG. 4, a browser toolbar or other helper application is installed which allows a user to easily switch between tasks by clicking tasks button 460 and selecting from the set of tasks the user has defined. Although a browser toolbar can be an advantageous means through which to facilitate the selection of a task, alternative task selection means, including, without limitation, a browser-based toolbar, and navigation to a separate web page to select the appropriate task, can be substituted therefor without departing from the spirit or the scope of the invention. In some embodiments, the task selection may be reflected in one or more cookies or other identifiers available to the browser.

In FIG. 4, the user has performed a search of a popular search engine, and a web page comprising a set of search results 405, 410, 415, 420, 425, 530, 435, 440 are displayed for the user. With the instant tool, and based on the keyboard shortcuts defined in FIG. 2, the user can easily navigate to any one of the set of search results by simply holding the CTRL and ALT keys and pressing the number corresponding to the desired search result. By way of example, without limitation, if the user wished to navigate to search result number 6 and view the web page associated therewith, the user would simply hold the CTRL and ALT keys and press the 6 key on the keyboard. Similarly, rather than having to move his or her hand from the keyboard to the mouse to click Next link 450, the user can easily jump to the next page of search results by holding the CTRL and ALT keys and pressing the N key on the keyboard.

Figure 5:
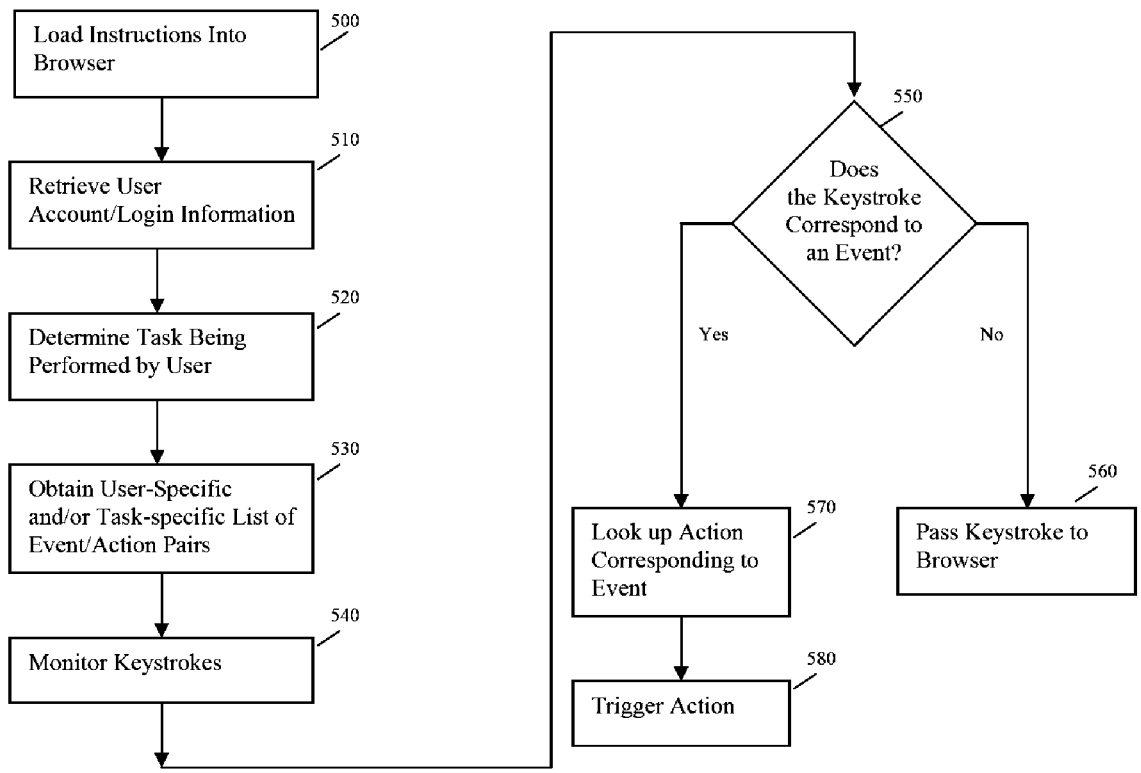
FIG. 5 is a flowchart illustrating an exemplary method by which event/action pairs can be trapped and acted upon by the instant tool.

FIG. 5 is a flowchart illustrating an exemplary method by which event/action pairs can be trapped and acted upon by the instant tool. In FIG. 5, the instructions necessary to facilitate the instant tool are loaded into a browser (Block 500). As described above, the instructions may be loaded as part of a browser plug-in or other browser enhancement, may be loaded as part of a web page visited by the browser, or the like. Once the instructions are loaded, the instant tool can identify the user (Block 510). In some embodiments, where alternative tools are available though which the user has already provided login information which has been properly authenticated, such as, without limitation, instant messaging, E-mail, or other such tools, the instant tool may utilize the credentials associated with those alternative tools to identify the user. Similarly, if the user has already visited a password-protected web site or otherwise provided the appropriate credentials to a web site associated or affiliated with the instant tool, the instant tool can take advantage of cookies or other identifiers to obviate the need for the user to provide the credentials again. Where such tools are not active or have not been installed, and where such web sites have not yet been visited, the instant tool can request the appropriate credentials from the user and validate the credentials. In some embodiments, the credentials may be validated against a local credentials database. In some embodiments, the credentials may be validated against a remote server. Where authentication fails, or where the user chooses not to provide such credentials, the instant tool may utilize a default set of credentials and/or a default set of event/action pairs.

Once the credentials have been determined, the event/action pairs associated with the user account can be loaded by the instant tool. In some embodiments, the entire set of event/action pairs can be obtained (Block 530). In some embodiments, the instant tool may only obtain those credentials associated with the particular task being performed by the user (Block 520). Once event/action pairs are obtained, the instant tool can monitor the user's interaction with the browser, including any keystrokes (Block 540). If a keystroke does not correspond to an event in an event/action pair for the current task (Block 550), the instant tool can pass the keystroke or other monitored interaction to the browser (Block 560). If the keystroke does correspond to an event in the event/action pairs associated with the current task, then the instant tool can look up the corresponding action (Block 570) and trigger the action (Block 580)

Figure 6:
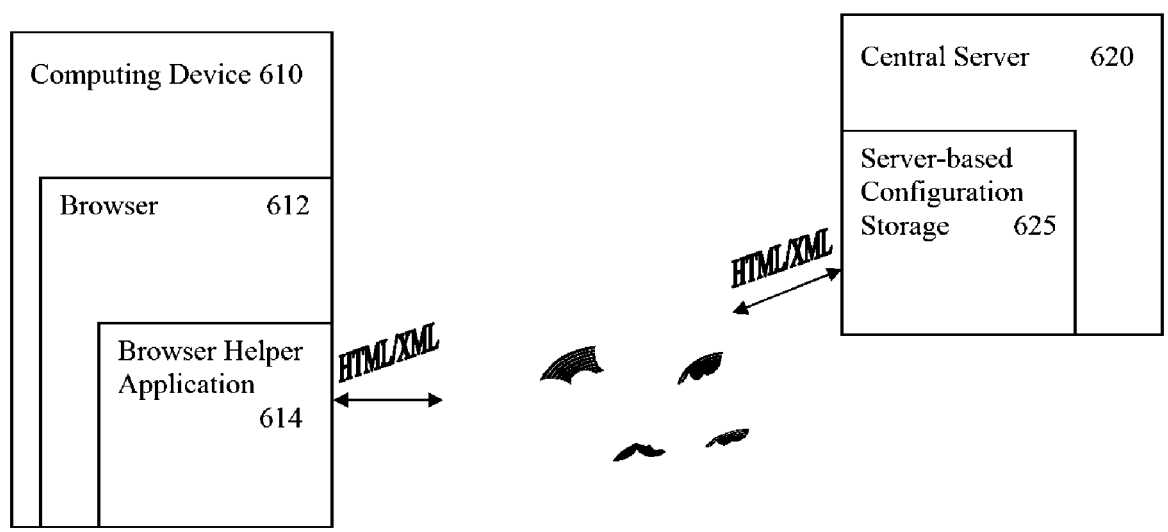
FIG. 6 is a block diagram illustrating an exemplary architecture through which the event/action pairs associated with the user account can follow the user regardless of the computing device used by the user.

FIG. 6 is a block diagram illustrating an exemplary architecture through which the event/action pairs associated with the user account can follow the user regardless of the computing device used by the user. In the embodiment illustrated in FIG. 6, the instant tool is installed on computing device 610 as part of browser helper application 614. Browser helper application 614 is automatically loaded when browser 612 is launched by computing device 610. In the illustrated embodiment, browser helper application 614 can handle authenticating the credentials supplied by the user by querying central server 620. If the credentials are successfully authenticated, the event/action pairs associated with the user's account can be obtained from server-based configuration storage 625. In some embodiments, central server 620 may be implemented as a distributed and/or redundant array of servers, thereby permitting the instant tool to access the event/action pairs even in the event of hardware failure, hardware maintenance, or other planned or unplanned outage. Similarly, server-based configuration storage 625 may comprised a distributed and/or redundant array of storage devices, thereby providing central server 620 with essentially uninterrupted access the event/action pairs stored therein.

In some embodiments, event/action pairs may be transmitted from server-based configuration storage 625 to browser helper application 614 as a list, and such a list may conform with the Hypertext Markup Language ("HTML"), Extensible Markup Language ("XML"), or the like. Table 1, below, provides an exemplary XML-based event/action pair definition.

TABLE 1

```
<event name="Ctrl-1">
    <key ctrl="on" shift="off" alt="off">1</key>
</event>
<action name="search next result" />
<action name="user-defined-1">
    <action name="other-user-defined-action2" />
    <action name="search next result" />
</action>
<action name='other-user-defined-action2'>
    <![CDATA[A6C3B1_BINARY_DATA_9CFEFA12A6]]>
</action>
```

TABLE 1-continued

```
<mapping event="Ctrl-1" >
    <task name="Work" action="search next result" />
    <task name="Home" action="user-defined-1" />
</mapping>
```

The XML feed of Table 1 comprises one event definition, three action definitions, and one mapping definition. The event definition ("Ctrl-1") defines how the instant system should handle the event corresponding to the user holding down the Ctrl key while pressing the number 1. As shown in Table 1, the key to be pressed (i.e. the 1 key), and the status of any modifier keys, such as, without limitation, the Ctrl, Shift, and Alt keys, can be included in the event definition.

The XML feed of Table 1 also includes three action definitions, "search next result", "user-defined-1", and "other-user-defined-action2". The search next result event launches a script of a similar name which causes the instant system to scroll the display to the next search result, navigate the browser to a page corresponding to the next search result, or the like. The user-defined-1 event launches two scripts in succession, the "other-user-defined-action2" script and the search next result script. The other-user-defined-action2 script is defined as macro, such as, without limitation, mouse movements, button presses, application launches, or the like that are defined by the user. Additional information on the process of defining macros is provided below.

The XML feed of Table 1 further includes a mapping definition associated with the Ctrl-1 event. The mapping definition specifies which of the defined actions should be triggered when an event is detected. The mapping definition can specify that different actions are to be taken based on the context, or task, in which the user is operating.

Figure 7:
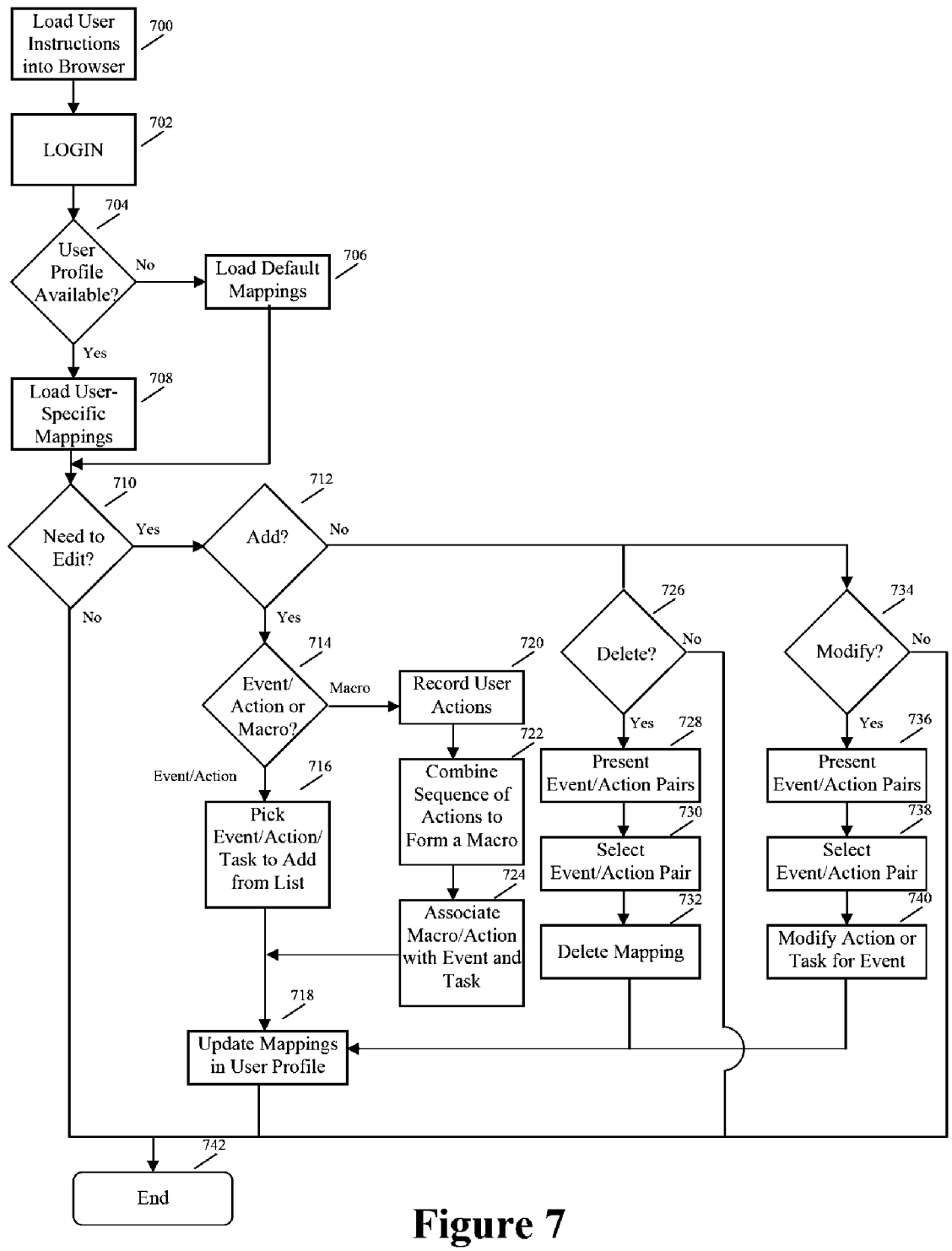
FIG. 7 is a flowchart illustrating an exemplary method by which a user can define event/action pairs.

FIG. 7 is a flow chart illustrating an exemplary method through which a user can define an event/action pair. In block 700, the instructions implementing the event/action pair functionality is loaded into a browser. In block 702, the user enters login information or other credentials, thereby allowing the instant system to identify the user. If a profile associated with the user is available to the instant system (block 704) the user-specific event/action pairs and mappings are loaded. Such event/action pairs and mappings may be loaded from a locally stored database, or from one or more remote databases (block 708). If no profile is available, or if the user is not able to enter appropriate credentials, a set of default event/action pairs and mappings can be loaded (block 706). If the user is content with the event/action pairs and mappings (block 710), then processing ends (block 742).

If, however, the user wishes to edit one or more event/action pairs or the mappings, the user can choose to add (block 712), delete (block 726) or modify (block 734) the event/action pair or mapping. When the user chooses to add a new event/action pair, the user is given the choice (block 714) between selecting from a set of predefined actions to be associated with an event (block 716) and recording a macro (block 720). If the user elects to record a macro, the instant system begins recording the user's interactions with the computing device (block 720) to create the macro (block 722). The macro is then associated with an event (block 724). The user is also given the opportunity to map the new event/action pair or event/macro pair with a particular context or to apply it across all contexts. Once the user has finished defining the new event/action pair, including any event/macro pairs, the mappings and event/action or event/macro pairs are added to the user's profile. For clarity, both event/action pairs and event/macro pairs will be collectively referred to herein as event/action pairs. In some embodiments, the new user profile is then transmitted to a central server for storage and subsequent retrieval.

When the user chooses to delete an event/action pair (block 726), the user can be presented with a list of the event/action pairs defined in his or her profile (block 728). The user then selects the event/action pair to be deleted (block 730) and the event/action pair can be deleted from the user's profile, along with any mapping information (block 732). Once the user has finished defining the new event/action pair, including any event/macro pairs, the mappings an event/action or event/macro pairs are added to the user's profile. In some embodiments, once the user has finished deleting any unwanted event/action pairs, the modified user profile is then transmitted to a central server for storage and subsequent retrieval.

When the user chooses to modify an event/action pair (block 734), the user is presented with a list of the event/action pairs defined is his or her profile (block 736). The user then selects the event/action pair to be modified (block 738) and modifies the action or macro associated with the event (block 740). The process used for modifying the action or event can be similar to that described above for adding a new event/action pair. In some embodiments, once the user has finished modifying the event/action pairs, the modified user profile is transmitted to a central server for storage and subsequent retrieval.

FIG. 8 provides exemplary pseudocode for implementing logic associated with the task-based tool described herein. FIG. 8 comprises a definition of four functions, trapEvents, initialize, checkUserTask, and getMappingForEvent. The trapEvents function begins by calling the initialization function if the initialization function has not yet been called. Once the initialization function has finished, if the user is performing an event for which an event/action pair has not been defined, the code exits and awaits a next event. If the event is mapped, then the code determines the action(s) associated with the event and executes the actions.

The initialize function reads determines whether the user is a registered user of the system and, if so, obtains the user's preferred configuration information, such as, without limitation, the event/action pairs to be loaded. If the configuration is unavailable, a default configuration set is obtained. Such default configuration set may be obtained, for example, from a local database, or from one or more remote servers. Once a configuration is available, the configuration information is parsed to obtain appropriate event/action pair mappings, and the parsed mappings are stored for later use.

The checkUserTask function determines the task, or context, in which the user is working. Such determination is made, in part, based on a plurality of variables, including, without limitation, the current URL being viewed by the user, the workspace in which the browser is being run, the username or other such identifier or credential associated with the user's current browser and/or workspace session, any user-specified task definitions, or the like.

The getMappingForEvent function begins by reading the mappings stored by the initialize function. The mappings are then compared to the event being performed by the user and, if an action or plurality of actions is associated with the event, the action is returned to the trapEvents function for execution.

Figure 9:
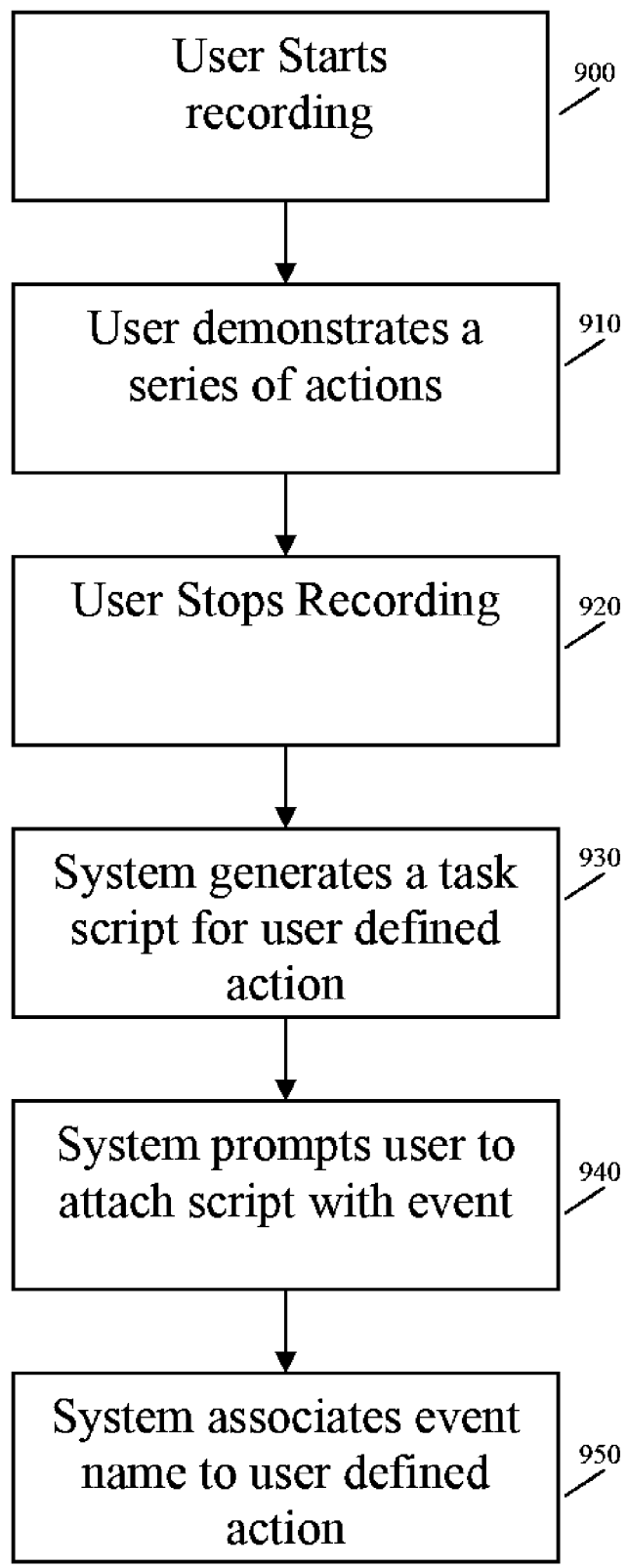
FIG. 9 is a block diagram illustrating an exemplary method through which event/action pairs can be defined.
Figure 10:
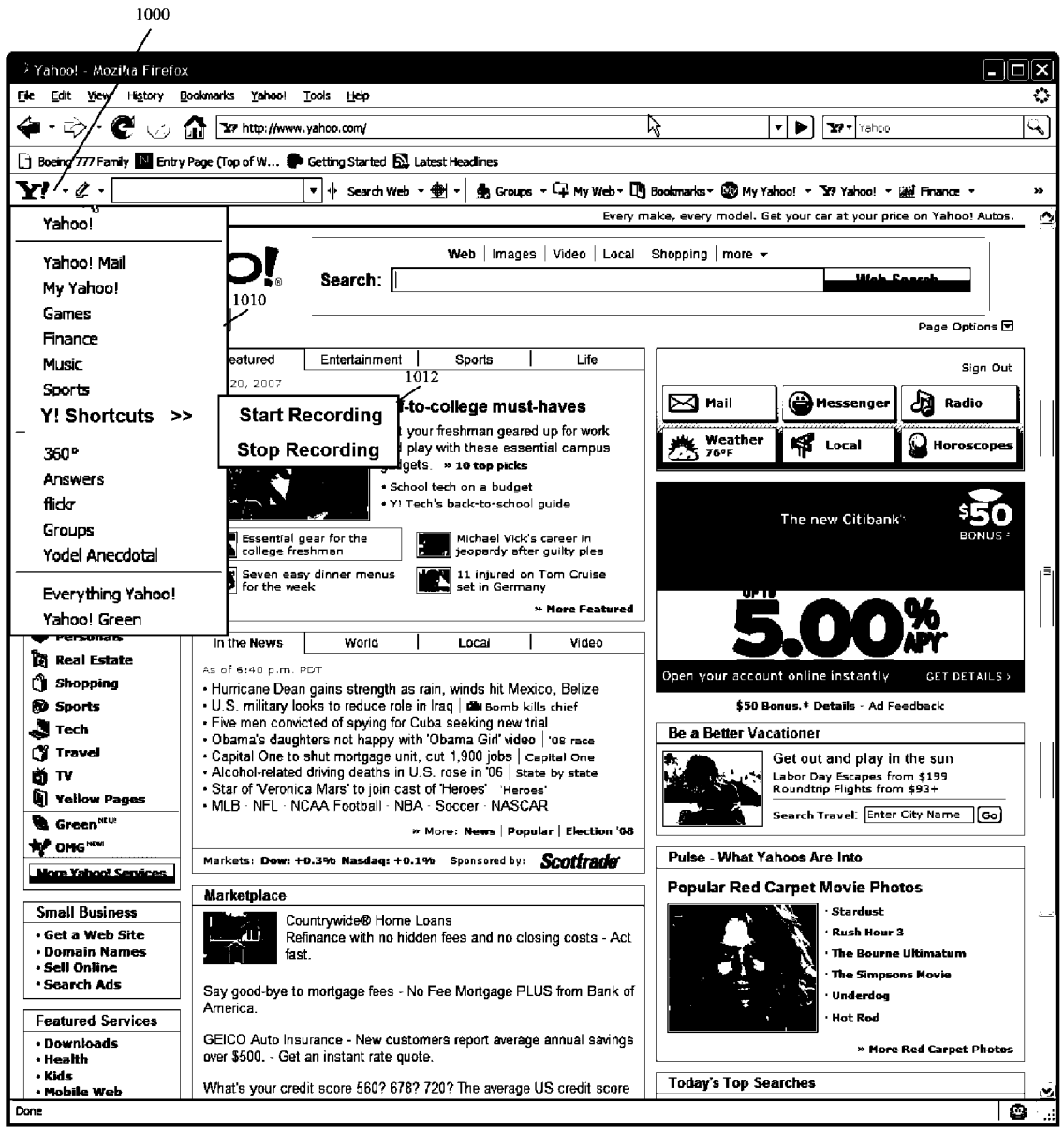
FIG. 10 is an exemplary screen capture of a user initiating the definition of an event/action pair.

FIG. 9 is a block diagram illustrating an exemplary method through which event/action pairs can be defined. In block 900, the user initiates the action recording process, such as, without limitation, by making an appropriate selection from a menu, clicking a button on a toolbar, or the like. This is illustrated in more detail in FIG. 10, in which the user has selected Start Recording 1012 from menu 1010, which is generated by toolbar 1000.

Figure 11:
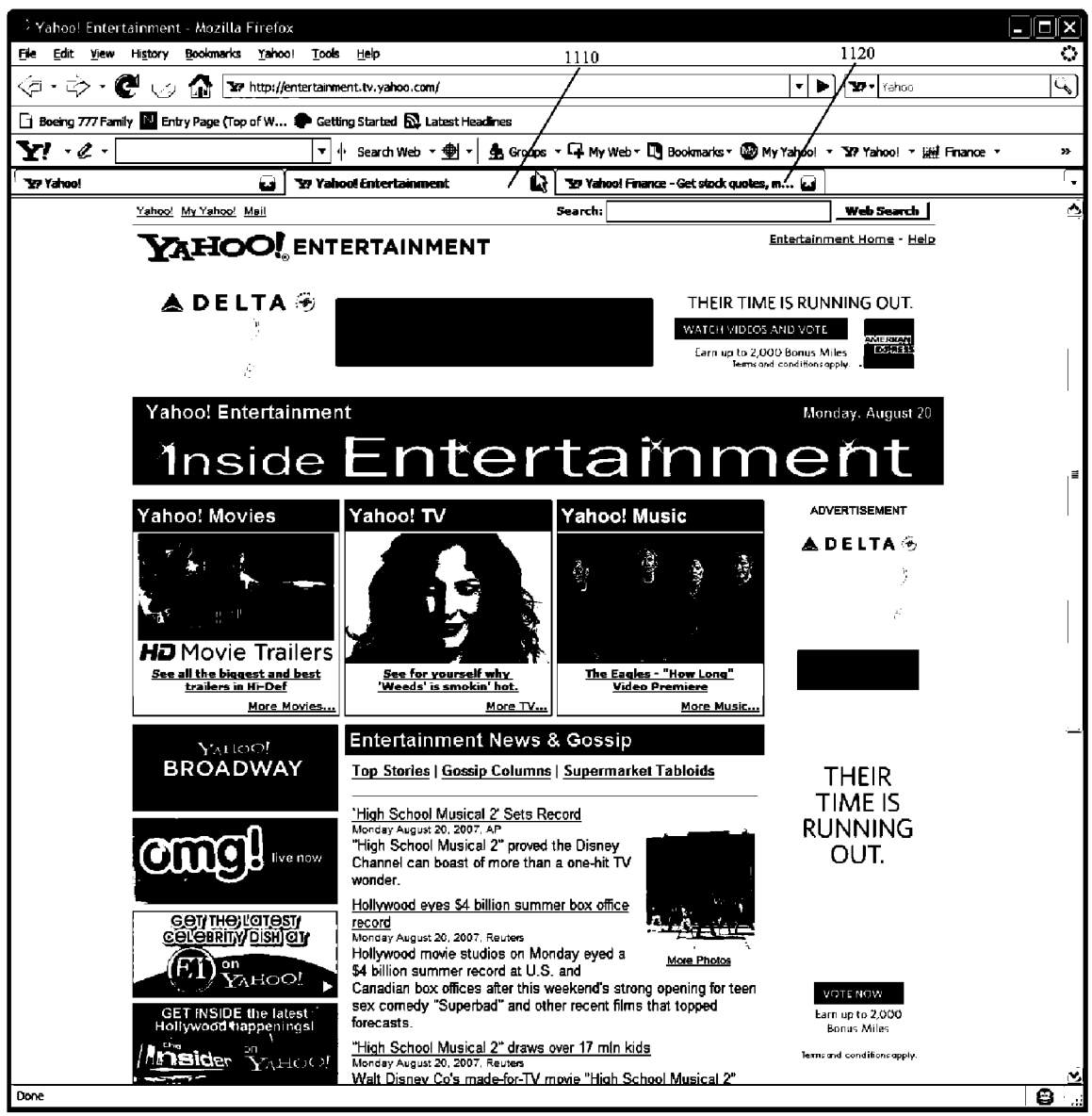
FIG. 11 is an exemplary screen capture of a user undertaking actions to be associated with an event.

In block 910, the user performs one or more actions, which are recorded by the instant system. This is illustrated in more detail in FIG. 11, wherein the user has instantiated two new browser tabs, 1110 and 1120, the tabs corresponding in to the Yahoo! Entertainment homepage and the Yahoo! Finance homepage, respectively.

Figure 12:
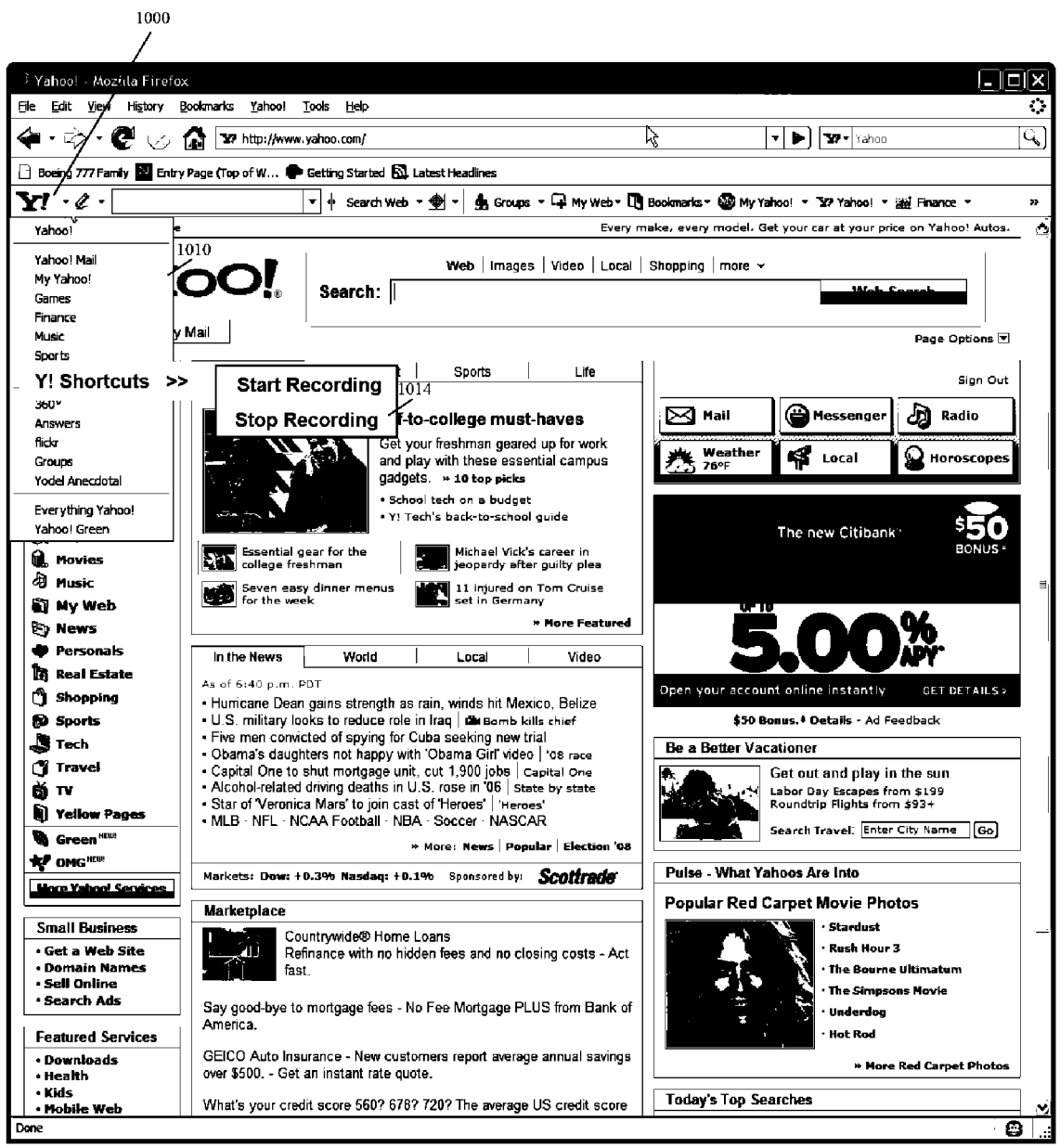
FIG. 12 is an exemplary screen capture of a user terminating the definition of an event/action pair.

In block 920, the user clicks a button on a toolbar, makes an appropriate selection from a menu, or the like to terminate the action recording process. This is illustrated in more detail in FIG. 12, wherein the user has selected Stop Recording menu item 1014 from menu 1010, which is generated by toolbar 1000.

In block 930, the instant system generates a task script for the actions recorded as part of block 910. FIG. 13 comprises an exemplary script for the actions illustrated in FIG. 11. In FIG. 13, the script begins with the definition of a script name, in this case "user-defined-Script-1". The script also defines two events, and identifies the specific operation to be performed by the browser ("open-tab") and the URL or other variables to be applied when the operation is performed (e.g., http://entertainment.tv.yahoo.com).

In block 940, the system prompts the user to associate the script generated in block 930 with an event. In block 950, the instant system associates the event with the user defined action and stores the script and the association for later use. FIG. 14 provides exemplary XML code defining the event/action pairing of blocks 940 and 950. In FIG. 14, the event comprises three primary definitions, an event definition, an action definition, and a mapping definition. The event definition comprises a name for the event (e.g., "Ctrl-1"), the status of any modifier keys, such as, without limitation, the CTRL, Shift, and/or ALT keys, that must be depressed to trigger the event, and any keystrokes or other events that must occur (e.g., the pressing of the "1" key). The action definition comprises a name (e.g. "user-defined-1") and the script to be performed when the event is triggered (e.g., "user-defined-Script-1"). The mapping definition maps the Ctrl-1 event to the user-defined-1 action.

While detailed and specific embodiments of the a task-based tool for speeding and customizing interactions with web documents have been described herein, it will be apparent to those skilled in the art that various changes and modifications can be made therein without departing from the spirit and scope of the a task-based tool for speeding and customizing interactions with web documents. Thus, it is intended that the present disclosure cover these modifications and variations provided they come within the scope of any appended claims and/or their equivalents.

What is claimed is:

1. A method comprising:
obtaining, via computing device, a first set of computer program instructions, wherein the first set of computer program instructions, when executed by at least one processor of the computing device, facilitates trapping of events received by a web browser;
obtaining, via the computing device, a set of event/action pairs;
causing, via the computing device, the first set of computer program instructions to run such that the events received by the web browser are trapped;
monitoring, via the computing device, the trapped events to determine whether a trapped event corresponds to one of the event/action pairs;

forwarding, via the computing device, the event to the browser for processing if the event does not correspond to an event/action pair;

determining, via the computing device, an action to be triggered based on the event if the event corresponds to an event/action pair; and triggering, via the computing device, the action;

determining a task being performed by the user; and, monitoring the trapped events such that only those event/action pairs from the set of event/action pairs which correspond to the task.

2. The method of claim 1, wherein the task is determined by receiving a task identifier from a user.

3. The method of claim 1, wherein the task is determined based on the context of the browsing session.

4. The method of claim 1, wherein the event/action pairs are obtained from a server.

5. The method of claim 4, wherein a default set of event/action pairs are obtained from the server.

6. The method of claim 4, further comprising obtaining a set of credentials from the user, wherein the set of event/action pairs obtained from the server are specific to the user as determined by the credentials.

7. The method of claim 1, wherein the event/action pairs are obtained from a database stored locally on a computing device on which the browser is running.

8. The method of claim 7, wherein a default set of event/action pairs are obtained from the local database.

9. The method of claim 7, further comprising obtaining a set of credentials from the user, wherein the set of event/action pairs obtained from the local database are specific to the user as determined by the credentials.

10. The method of claim 1, wherein the first set of computer program instructions are obtained when the browser loads a web page.

11. The method of claim 1, wherein the first set of computer program instructions are obtained when a browser helper object is loaded by the browser.

12. The method of claim 1, wherein each event/action pair comprises a keyboard shortcut and an action to be taken when the user presses the keys corresponding to the keyboard shortcut.

13. The method of claim 1, further comprising:

receiving from the user a request to modify an event/action pair;

presenting a user interface to the user by which the user can modify an event/action pair; and, storing the modified event/action pair.

14. The method of claim 13, wherein the modified event/action pair is associated with the user and stored on a server.

15. The method of claim 13, wherein the event/action pair modification comprises the addition of a new event/action pair.

16. The method of claim 13, wherein the event/action pair modification comprises the deletion of an event/action pair.

17. The method of claim 13, wherein the user interface comprises a set of predefined actions from which the user can select a desired action to be associated with an event.

18. A non-transitory medium tangibly comprising computer executable instruction, that when executed by a computing device, perform a method comprising:

obtaining a first set of computer program instructions, wherein the first set of computer program instructions, when executed by the computing device, facilitates trapping of events received by a web browser;

obtaining a set of event/action pairs;

causing the first set of computer program instructions to run such that the events received by the web browser are trapped;

monitoring the trapped events to determine whether a trapped event corresponds to one of the event/action pairs;

forwarding the event to the browser for processing if the event does not correspond to an event/action pair;

determining an action to be triggered based on the event if the event corresponds to an event/action pair; and triggering the action;

determining a task being performed by the user; and, monitoring the trapped events such that only those event/action pairs from the set of event/action pairs which correspond to the task.

19. The non-transitory medium of claim 18, wherein the task is determined by receiving a task identifier from a user.

20. The non-transitory medium of claim 18, wherein the task is determined based on a context of a browsing session.

21. The non-transitory medium of claim 18, wherein the obtaining event/action pairs comprise obtaining the event/action pairs from a server.

22. The non-transitory medium of claim 21, further comprising:

obtaining a set of credentials from the user, wherein the set of event/action pairs obtained from the server are specific to the user as determined by the credentials.

23. The non-transitory medium of claim 18, wherein the first set of computer program instructions are obtained when a browser helper object is loaded by the browser.

* * * * *